United States Patent
Romero Regalado et al.

(10) Patent No.: US 9,908,394 B2
(45) Date of Patent: Mar. 6, 2018

(54) PROTECTIVE COVER SYSTEM AND RELATED METHOD

(71) Applicant: FORD GLOBAL TECHNOLOGIES, LLC, Dearborn, MI (US)

(72) Inventors: Adrian Romero Regalado, Cuautitlan Izcalli (MX); Jorge Jara Zambrano, Atizapán de Zaragoza (MX); Mauricio Ivan Valadez Torres, Coacalco de Berrriozabal (MX); Sergio Alberto Vega Velazquez, Nicolas Romero (MX)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/204,512

(22) Filed: Jul. 7, 2016

(65) Prior Publication Data

US 2018/0009303 A1    Jan. 11, 2018

(51) Int. Cl.
| | |
|---|---|
| *B60J 7/00* | (2006.01) |
| *B60J 11/02* | (2006.01) |
| *G01S 17/02* | (2006.01) |
| *B60R 16/03* | (2006.01) |
| *B60R 19/48* | (2006.01) |
| *G01S 15/04* | (2006.01) |

(52) U.S. Cl.
CPC ............. *B60J 11/025* (2013.01); *B60R 16/03* (2013.01); *B60R 19/48* (2013.01); *G01S 15/04* (2013.01); *G01S 17/026* (2013.01)

(58) Field of Classification Search
CPC ... B60R 21/0136; B60R 19/483; B60R 21/34; A47L 2201/00; A47L 2201/04; A47L 11/4011; A47L 11/4061; B60J 11/02; B60J 11/00

USPC .......................... 296/199; 293/117, 120, 121
See application file for complete search history.

(56) References Cited

U.S. PATENT DOCUMENTS

| | | | | |
|---|---|---|---|---|
| 2,688,513 | A | * | 9/1954 | Poirier ..................... B60J 11/02 135/115 |
| 4,432,581 | A | * | 2/1984 | Guma ..................... B60J 11/02 135/88.07 |
| 4,657,298 | A | * | 4/1987 | O ............................. B60J 11/02 135/119 |

(Continued)

FOREIGN PATENT DOCUMENTS

| | | |
|---|---|---|
| CN | 102632842 A | 8/2012 |
| CN | 202528916 U | 11/2012 |

(Continued)

OTHER PUBLICATIONS

English Machine Translation of CN102632842A.

(Continued)

*Primary Examiner* — Kiran B Patel
(74) *Attorney, Agent, or Firm* — Vichit Chea; King & Schickli, PLLC (57) ABSTRACT

A protective cover system for a motor vehicle includes a first roller, a first cover wound onto the first roller, a second roller and a second cover wound onto the second roller. The protective cover system also includes a control module for displacing the covers between stowed and deployed positions covering one or both of the motor vehicle bumper and an interior cargo floor of the motor vehicle.

12 Claims, 6 Drawing Sheets

(56) References Cited

U.S. PATENT DOCUMENTS

| | | | | |
|---|---|---|---|---|
| 4,718,711 A * | 1/1988 | Rabbit | B60J 11/02 296/136.03 |
| 4,727,898 A * | 3/1988 | Guma | B60J 11/02 135/87 |
| 4,856,842 A * | 8/1989 | Ross | B60J 11/02 150/166 |
| 4,966,406 A * | 10/1990 | Karasik | B60J 11/00 296/136.02 |
| 5,022,700 A * | 6/1991 | Fasiska | B60J 11/02 160/26 |
| 5,029,933 A * | 7/1991 | Gillem | B60J 11/00 150/166 |
| 5,129,678 A * | 7/1992 | Gurbacki | B60J 11/06 150/166 |
| 5,176,421 A * | 1/1993 | Fasiska | B60J 11/02 150/166 |
| 5,342,260 A * | 8/1994 | Markland | A63B 69/0022 434/253 |
| 5,364,155 A * | 11/1994 | Kuwahara | B60J 11/00 296/136.04 |
| 5,409,286 A * | 4/1995 | Huang | B60J 11/00 150/166 |
| 5,423,588 A * | 6/1995 | Eglinton | B60J 7/085 224/324 |
| 5,511,845 A * | 4/1996 | Hindson | B60J 11/00 160/370.21 |
| 5,567,002 A * | 10/1996 | Tair | B60J 11/02 296/136.03 |
| 5,597,196 A * | 1/1997 | Gibbs | B60J 11/02 160/326 |
| 5,823,607 A * | 10/1998 | Hindson | B60J 11/00 160/370.21 |
| 6,196,623 B1 | 3/2001 | Shackelford et al. | |
| 6,371,547 B1 * | 4/2002 | Halbrook | B60J 11/00 150/166 |
| 6,663,156 B1 * | 12/2003 | Kincaid | B60R 5/04 296/37.14 |
| 9,776,465 B2 * | 10/2017 | Merino Almeida | B60D 1/54 |
| 2006/0214465 A1 | 9/2006 | Chau | |
| 2007/0029827 A1 * | 2/2007 | Meyer | B60R 19/44 293/142 |
| 2007/0096501 A1 * | 5/2007 | Tan | B60J 11/00 296/136.1 |
| 2008/0191507 A1 * | 8/2008 | Farber | B60P 1/4421 296/57.1 |
| 2015/0076857 A1 | 3/2015 | Iifliyandskyi et al. | |
| 2015/0367717 A1 * | 12/2015 | Hu | B60J 11/04 296/136.04 |
| 2017/0136838 A1 * | 5/2017 | Merino Almeida | B60D 1/54 |

FOREIGN PATENT DOCUMENTS

CN 103241107 A 8/2013
KR 1347595 B1 1/2014

OTHER PUBLICATIONS

English Machine Translation of CN103241107A.
English Machine Translation of CN202528916U.
English Machine Translation of KR1347595B1.

* cited by examiner

PROTECTIVE COVER SYSTEM AND RELATED METHOD

TECHNICAL FIELD

This document relates generally to the motor vehicle equipment field and, more particularly, to a protective cover system for a bumper and interior cargo floor of a motor vehicle as well as to a related method of protecting an operator's clothing and an interior cargo floor of a motor vehicle from road dirt on a bumper of the motor vehicle.

BACKGROUND

The rear bumper of a motor vehicle has a tendency to get dirty during motor vehicle operation. This is particularly true when the motor vehicle is operated during inclement weather conditions or off road.

This document relates to a new and improved protective cover system and related method that protects an operator's clothing and an interior cargo floor of a motor vehicle from road dirt and grime on a motor vehicle bumper when an operator opens the trunk, lift gate or tail gate in order to access the interior floor of the motor vehicle.

SUMMARY

In accordance with the purposes and benefits described herein, a protective cover system is provided for a bumper of a motor vehicle. That protective cover system comprises: (a) a first cover displaceable between a stowed position and a deployed position, (b) a bumper surface condition sensor, (c) a presence sensor and (d) a control module. That control module is responsive to the bumper surface condition sensor and the presence sensor to deploy the cover over the bumper at a desired time.

The protective cover system may further include a first roller and the first cover may be wound onto that first roller. Further, the control module may include a first roller drive mechanism and a controller.

That first roller drive mechanism may include a first drive motor and a first linkage connecting the first drive motor to the first roller. Further, the controller may be configured to deploy the first cover from the first roller over the bumper in response to signals received from the bumper surface condition sensor and the presence sensor.

In some embodiments, the bumper surface condition sensor may include a window in the bumper and a photoelectric sensor directed toward the window so that the photoelectric sensor detects substances such as water droplets and dirt deposited on the bumper.

Further, the presence sensor may be selected from a group of devices consisting of a photoelectric sensor, a motion sensor, a motion sensor, an ultrasonic sensor, an infrared sensor and combinations thereof.

In accordance with yet another aspect, a protective cover system is provided for a motor vehicle. That protective cover system comprises: (a) a first roller, (b) a first cover wound onto the first roller, (c) a second roller and (d) a second cover wound onto the second roller. That first roller is displaceable between a first stowed position wound onto the first roller and a first deployed position covering a bumper of the motor vehicle. The second cover is displaceable between a second stowed position wound onto the second roller and a second deployed position overlying an interior cargo floor of the motor vehicle.

The protective cover system may further include a bumper surface condition sensor, a presence sensor and a control module responsive to the bumper surface condition sensor and the presence sensor to deploy the first cover over the bumper. The control module may include a first roller drive mechanism and a controller. The first roller drive mechanism may include a first drive motor and a first linkage connecting the first drive motor to the first roller.

In addition, the control module may further include a second roller drive mechanism including a second drive motor and a second linkage connecting the second drive motor to the second roller. In addition the controller may be configured to deploy the first cover from the first roller over the bumper in response to signals received from the bumper surface condition sensor and the presence sensor. Further, the controller may be configured to deploy the second cover from the second roller over the interior cargo floor in response to the signals received from the bumper surface condition sensor and the presence sensor.

Still further, a guide roller may be carried on a distal end of the second cover. That guide roller may ride upon the interior cargo floor and support the second cover during displacement of the second cover between the second stowed position and the second deployed position.

Still further, the protective cover system may include a first actuator connected to the control module whereby the first cover may be selectively displaced between the first stowed position and the first deployed position. In addition, the protective cover system may include a second actuator connected to the control module whereby the second cover may be selectively displaced between the second stowed position and the second deployed position.

In accordance with still another aspect, a method is provided of protecting an operator's clothing and an interior cargo floor of a motor vehicle from dirt. That method may be described as comprising the steps of: (a) detecting, by a first device, a substance deposited on a bumper of the motor vehicle, (b) detecting, by a second device, a presence of an operator near the bumper, and (c) deploying, by a control module, a first cover over the bumper. Further, the method may include the step of (d) deploying, by the control module, a second cover over an interior cargo area of the motor vehicle.

In the following description, there are shown and described several preferred embodiments of the protective cover system and the related method. As it should be realized, the protective cover system and related method are capable of other, different embodiments and their several details are capable of modification in various, obvious aspects all without departing from the system and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the protective cover system and method and together with the description serve to explain certain principles thereof. In the drawing figures.

Reference will now be made in detail to the present preferred embodiments of the protective cover system and method, examples of which are illustrated in the accompanying drawing figures.

DETAILED DESCRIPTION

Reference is now made to FIGS. 1-5 illustrating the protective cover system 10 for the bumper 12 and the interior cargo floor 14 of a motor vehicle 16.

The protective cover system 10 may be generally described as including a first roller 18 and a first cover 20 wound onto the first roller. Further, the protective cover system 10 includes a second roller 22 and a second cover 24 wound onto the second roller.

Figure 2:
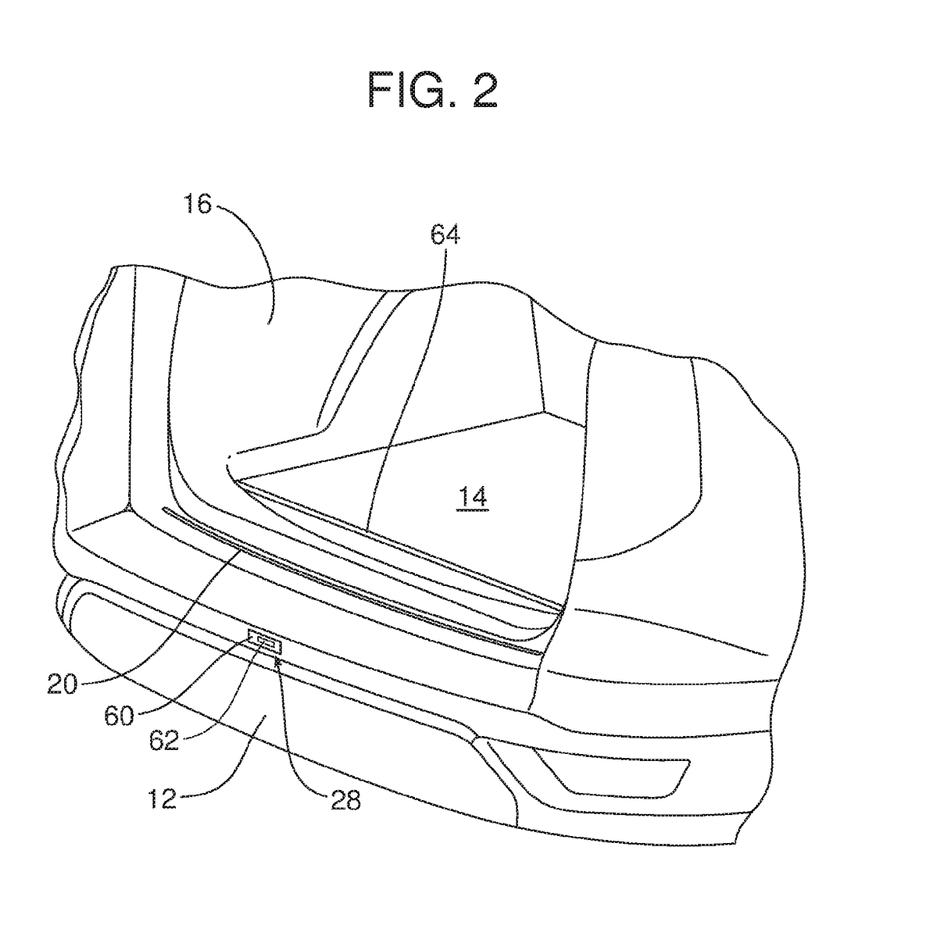
FIG. 2 is a perspective view of the motor vehicle also illustrating the two covers in the stowed position as illustrated in FIG. 1.
Figure 3:
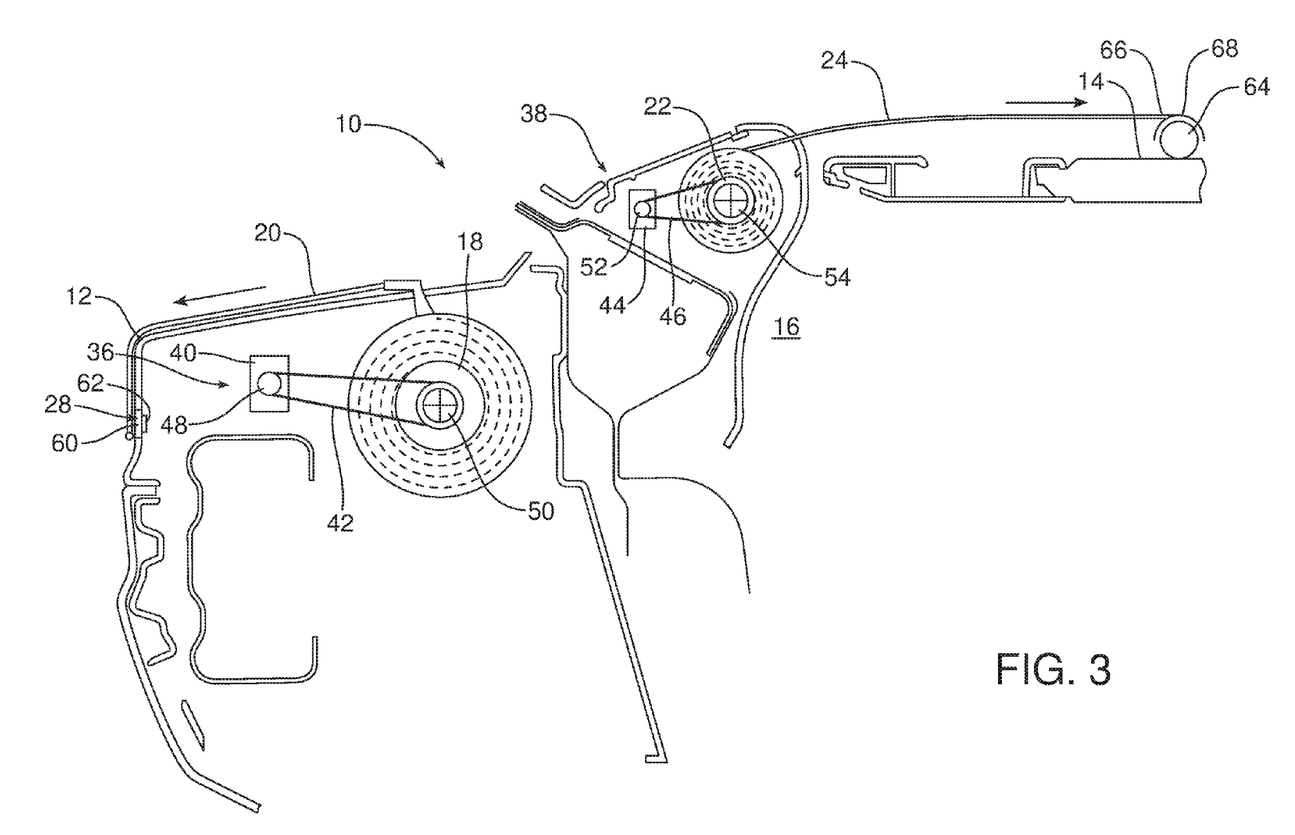
FIG. 3 is a schematic illustration of the protective cover system as illustrated in FIG. 1 except the two covers are shown in the deployed position.
Figure 4:
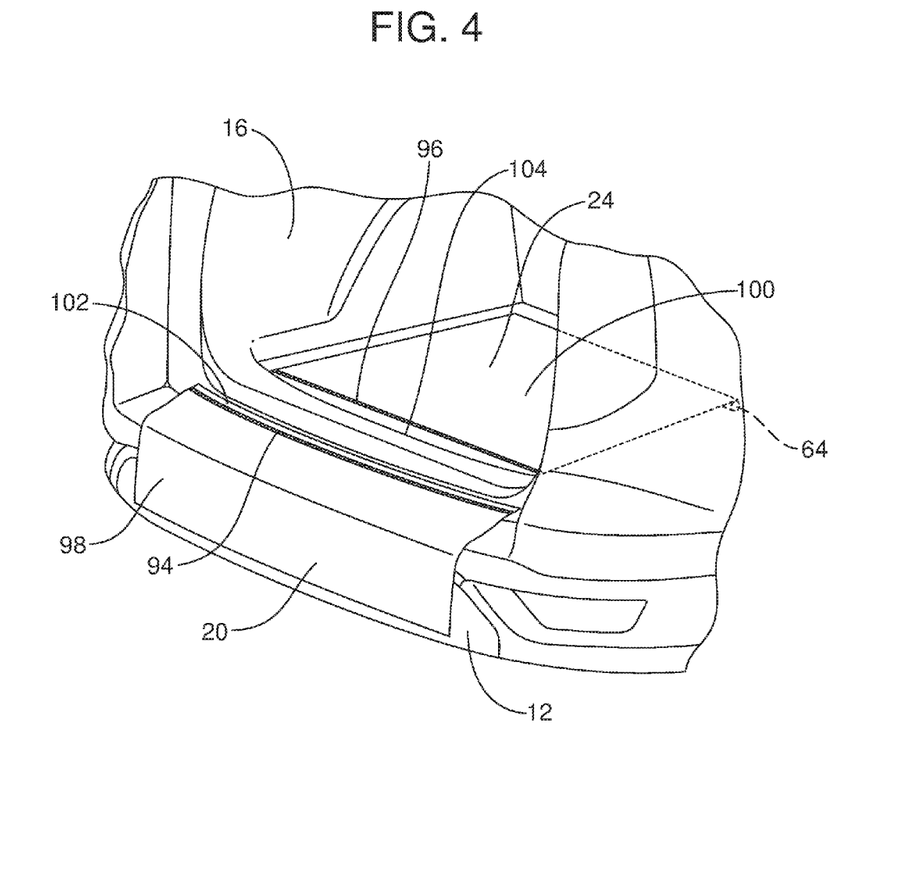
FIG. 4 is a view similar to FIG. 2 but showing the two covers in a deployed position as illustrated in FIG. 3.

As will become apparent from the following description, the first cover 20 is displaceable between a first stowed position wound onto the first roller 18 (See FIGS. 1 and 2) and a first deployed position covering the bumper 12 of the motor vehicle 16 (See FIGS. 3 and 4). The second cover 24 is displaceable between a second stowed position wound onto the second roller 22 (See FIGS. 1 and 2) and a second deployed position overlying an interior cargo floor 14 of the motor vehicle 16 (See FIGS. 3 and 4). Both of the covers 20, 24 may include guide wires or stays (not shown) which provide the necessary stiffness to allow the covers to be displaced efficiently and effectively from the stowed positions to the deployed positions. Such guide wires or stays also efficiently wind onto the rollers 18, 22 when the covers 20, 24 are displaced from the deployed positions to the stowed positions.

Figure 5:
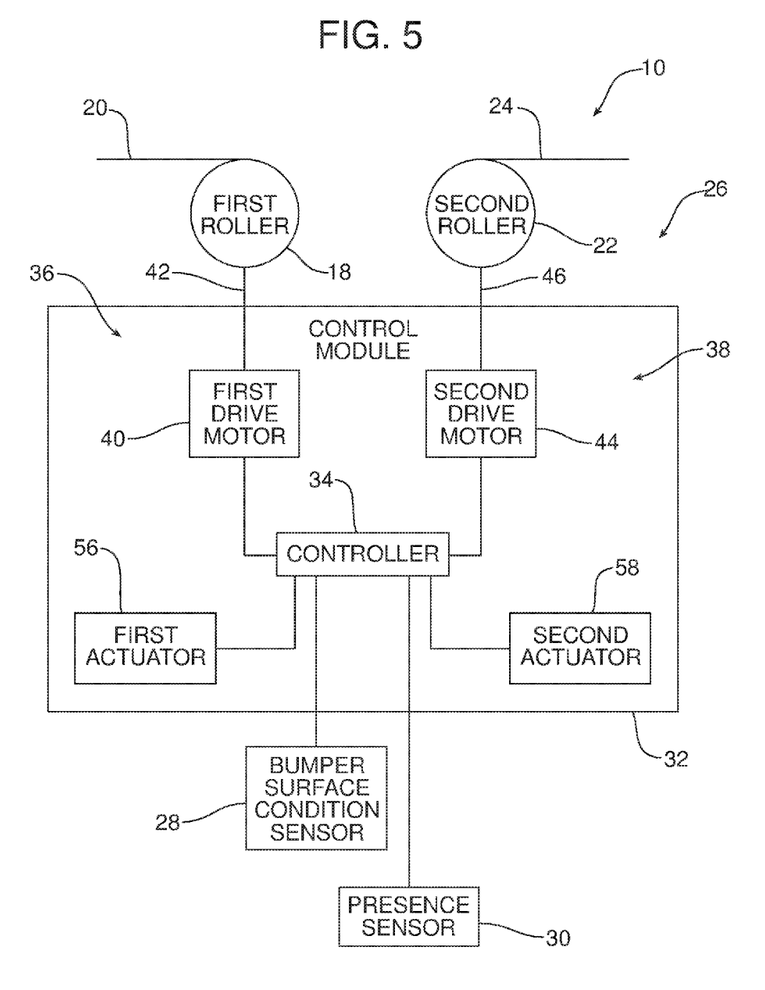
FIG. 5 is a schematic block diagram of the protective cover system illustrating the details of the control module.

Reference is now made to FIG. 5 illustrating the control system 26 of the protective cover system 10. That control system 26 includes a bumper surface condition sensor 28, a presence sensor 30 and a control module 32 responsive to the bumper surface condition sensor and the presence sensor to deploy the first cover 20 over the bumper 12 and the second cover 24 over the interior cargo floor 14.

More specifically, as illustrated in FIG. 5, the control module 32 includes a controller 34 connected to a first roller drive mechanism 36 and a second roller drive mechanism 38. More specifically, the controller 34 comprises a computing device, such as a dedicated microprocessor or electronic control unit (ECU) operating in accordance with instructions from appropriate control software. Such a controller 34 may comprise one or more processors, one or more memories and one or more network interfaces that communicate with each other over a communication bus.

The first roller drive mechanism 36 includes a first drive motor 40 connected via the linkage 42 to the first roller 18. Similarly, the second roller drive mechanism 38 includes a second drive motor 44 connected by a second linkage 46 to the second roller 22. In the embodiments illustrated in FIGS. 1 and 3, the first linkage 42 comprises a drive belt connecting the drive shaft pulley 48 of the drive motor 40 to the first driven pulley 50 of the first roller 18. The second linkage 46 comprises a drive belt connecting the drive shaft pulley 52 of the second drive motor 44 to the second driven pulley 54 of the second roller 22. Here it should be appreciated that other types of drive linkages could be utilized including worm drives, other gear drives or even a direct drive.

Figure 1:
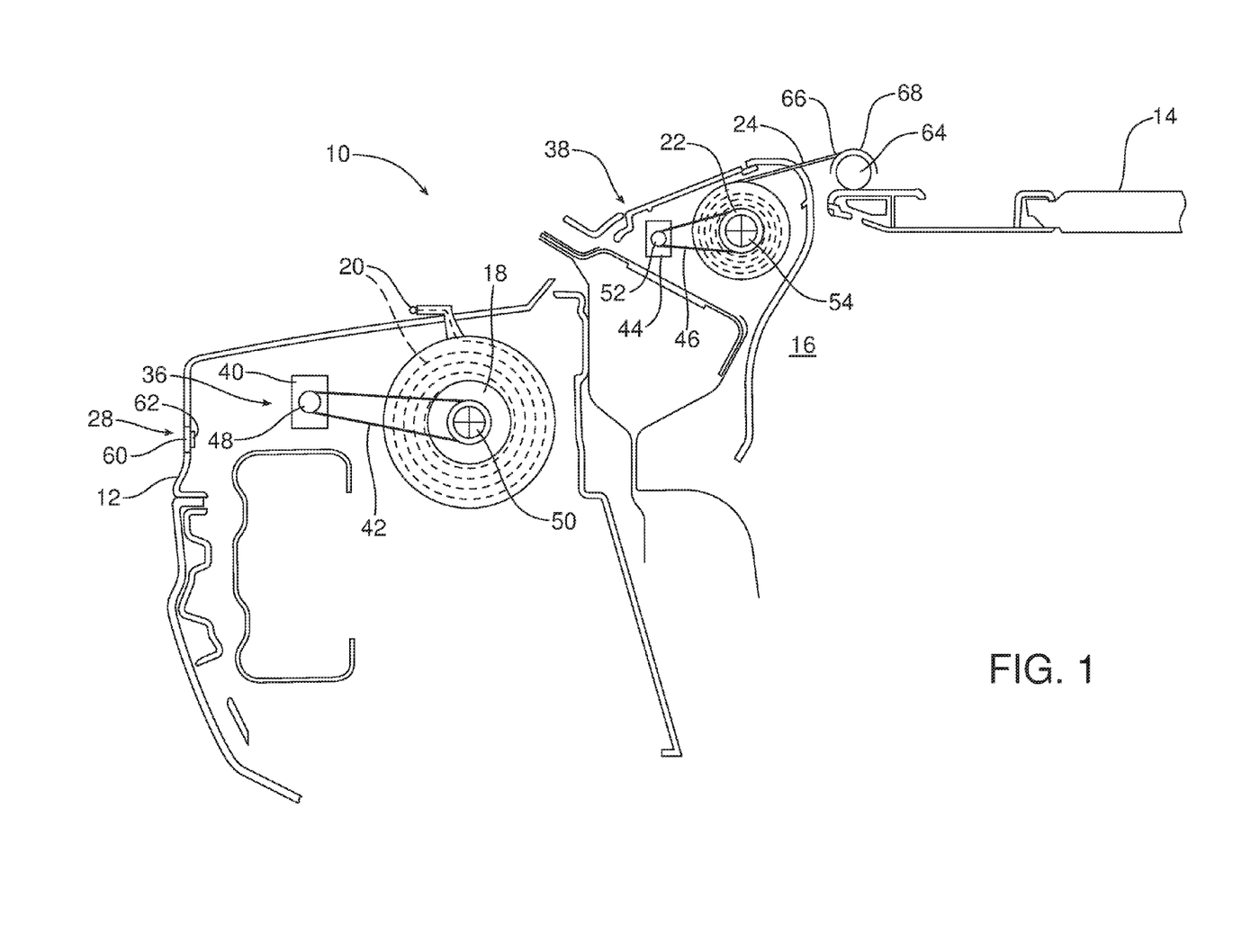
FIG. 1 is a schematic illustration of one possible embodiment of the protective cover system incorporating two rollers and two covers that may be deployed to cover the bumper and the interior cargo floor of the motor vehicle. The two covers are illustrated in the stowed position.

As further illustrated in FIG. 5, the control module 32 also includes a first actuator 56 such as a push button, toggle switch, touch screen display button or voice activation system, connected to the controller 34 whereby activation of the first actuator 56 selectively displaces the first cover 20 between the first stowed position wound upon the first roller 18 as illustrated in FIGS. 1 and 2 and the first deployed position overlying the bumper 12 as illustrated in FIGS. 3 and 4. Similarly, the control module 32 may also include a second actuator 58, like the first actuator 56, but adapted to displace the second cover 24 between the second stowed position wound onto the second roller 22 as illustrated in FIGS. 1 and 2 and the second deployed position overlying the interior cargo floor 14 as illustrated in FIGS. 3 and 4.

In one possible embodiment, the bumper surface condition sensor 28 includes a window 60 in the bumper 12 and a photoelectric sensor 62 directed toward the window so that the photoelectric sensor detects substances such as water droplets and dirt deposited on the bumper. Here, it should be appreciated that other devices and arrangements could be utilized for this purpose.

The presence sensor 30 may be selected from a group of devices consisting of a photoelectric sensor, a motion sensor, an ultrasonic sensor, an infrared sensor and combinations thereof. However, this listing should not be considered limiting as other devices could be used for this purpose.

A guide roller 64 is connected to the distal end 66 of the second cover 24 by means of the guide roller support housing 68. As should be appreciated, the guide roller 64 rides upon the interior cargo floor 14 and supports the second cover 24 as that second cover is displaced between the second stowed position wound upon the second roller 22 as illustrated in FIGS. 1 and 2 and the second deployed position overlying and covering the interior cargo floor 14 as illustrated in FIGS. 3 and 4.

Consistent with the above description, a method is provided for protecting an operator's clothing and the interior cargo floor 14 of the motor vehicle 16 from dirt and water being transferred from a bumper 12. That method includes detecting by a first device or bumper surface condition sensor 28, a substance, such as water droplets or dirt, deposited on the bumper 12 of the motor vehicle 16. The method also includes the step of detecting, by a second device or presence sensor 30, the presence of an operator near the bumper 12. In addition, the method includes the step of deploying, by means of the control module 32, the first cover 20 over the bumper 12. In addition, the method includes the step of deploying, by the control module 32, the second cover 24 over the interior cargo floor 14 of the motor vehicle 16. As previously noted, the controller 34 of the control module 32 controls the displacement of the first cover 20 and the second cover 24 between the stowed and deployed positions in response to input from the first actuator 56, the second actuator 58 and the data provided by the bumper surface condition sensor 28 and the presence of the sensor 30.

Figure 6:
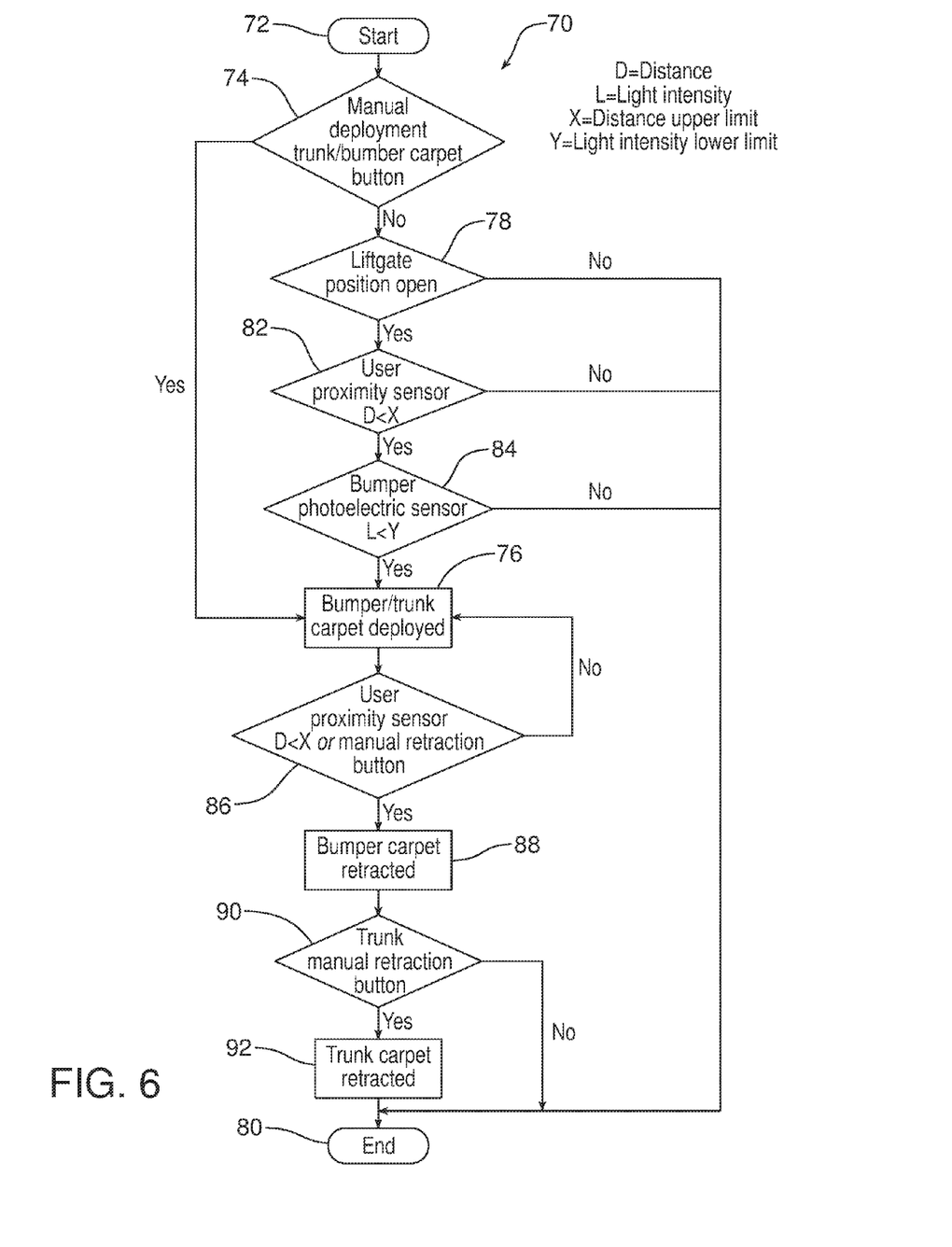
FIG. 6 is a control logic flow diagram for one possible embodiment of the protective cover system.

Reference is now made to FIG. 6 illustrating one possible control logic flow diagram 70 for the protective cover system 10. This system 10 is initiated at the start box 72. System initiation may be keyed to detection of the presence of the coded, motor vehicle specific, key fob (not shown) of the motor vehicle operator within a given distance of the motor vehicle 16. Upon initiation, the controller 34 determines if the first actuator 56 and/or the second actuator 58 have been activated (see Box 74). If the first actuator 56 has been activated, the controller 34 sends an appropriate signal to the first drive motor 40 to deploy the first cover 20 over the bumper 12. See box 76. If the second actuator 58 has been activated, the controller 34 sends an appropriate control signal to the second drive motor 44 to deploy the second cover 24 over the interior cargo floor 14 (again see Box 76). In contrast, if neither actuator 56, 58 has been activated, the system goes to Box 78 and the controller 34 receives data from the trunk lid/lift gate/tailgate control module (not shown) indicating if the trunk lid/lift gate (hereinafter "closure") is open. If the closure is closed, the protective cover system 10 goes to the end of its operating cycle (See Box 80).

If the closure is open, the controller 34 reviews the data received from the presence sensor 30 to determine if a user or operator is in the proximity of the rear or bumper 12 of the motor vehicle 16. See Box 82. If the presence sensor 30 indicates that the user is not at the rear of the motor vehicle 16 near the bumper 12, the operating cycle ends at Box 80. In contrast, if the presence sensor 30 indicates that the user is in the proximity of the bumper 12 at the rear of the motor vehicle 16, the controller 34 considers the data being provided by the bumper surface condition sensor 28 at Box 84. If the data provided by the bumper surface condition sensor 28 does not indicate the presence of water droplets and dirt, the operating cycle ends at Box 80. However, if water droplets or dirt is detected by the bumper surface condition sensor 28, the controller 34 responds by deploying the first cover 20 over the bumper 12 and the second cover 24 over the interior cargo floor 14. See Box 76. The first cover 20 remains deployed over the bumper 12 unless (a) the user leaves the area behind the motor vehicle 16 adjacent the bumper 12 as indicated to the controller 34 by the presence sensor 30 or (b) the operator activates the first actuator 56 to stow the first cover 20 (see Boxes 86 and 88). Similarly, the second cover 24 remains in the deployed position overlying the interior cargo floor 14 unless the user or operator activates the second actuator 58 to stow the second cover (see Boxes 90 and 92).

In summary, the protective cover system 10 provides a number of benefits and advantages including automated protection for user clothing and the interior cargo floor 14 from dirt and debris commonly found on the bumper 12 of a motor vehicle 16.

The foregoing has been presented for purposes of illustration and description. It is not intended to be exhaustive or to limit the embodiments to the precise form disclosed. Obvious modifications and variations are possible in light of the above teachings. For example, as illustrated in FIG. 4, the cover 20 may include a zipper 94 and the cover 24 may include a zipper 96. The zippers 94, 96 may be unzipped to allow the distal sections 98, 100 of the covers 20, 24 to be removed for cleaning. The proximal sections 102, 104 of the covers 20, 24 remain wound on the rollers 18, 22. All such modifications and variations are within the scope of the appended claims when interpreted in accordance with the breadth to which they are fairly, legally and equitably entitled.

What is claimed is:

1. A protective cover system for a motor vehicle, comprising:

a first roller;

a first cover wound onto said first roller;

a second roller; and a second cover wound onto said second roller;

wherein said first cover is displaceable between a first stowed position wound onto said first roller and a first deployed position covering a bumper of the motor vehicle and the second cover is displaceable between a second stowed position wound onto said second roller and a second deployed position overlying an interior cargo floor of the motor vehicle.

2. The protective cover system of claim 1, further including a bumper surface condition sensor, a presence sensor and a control module responsive to said bumper surface condition sensor and said presence sensor to deploy said first cover over said bumper.

3. The protective cover system of claim 2, wherein said control module includes a first roller drive mechanism and a controller.

4. The protective cover system of claim 3, wherein said first roller drive mechanism includes a first drive motor and a first linkage connecting said first drive motor to said first roller.

5. The protective cover system of claim 4, wherein said controller is configured to deploy said first cover from said first roller over the bumper in response to signals received from said bumper surface condition sensor and said presence sensor.

6. The protective cover system of claim 5, wherein said bumper surface condition sensor includes a window in said bumper and a photoelectric sensor directed toward said window so that said photoelectric sensor detects substances deposited on the bumper.

7. The protective cover system of claim 5, wherein said presence sensor is selected from a group of devices consisting of a photoelectric sensor, a motion sensor, an ultrasonic sensor, an infrared sensor and combinations thereof.

8. The protective cover system of claim 5, wherein said control module further includes a second drive mechanism including a second drive motor and a second linkage connecting said second drive motor to said second roller.

9. The protective cover system of claim 8, wherein said controller is configured to deploy said second cover from said second roller over said interior cargo floor in response to said signals received from said bumper surface condition sensor and said presence sensor.

10. The protective cover system of claim 9, further including a guide roller carried on a distal end of said second cover, said guide roller riding upon said interior cargo floor and supporting said second cover during displacement of said second cover between said second stowed position and said second deployed position.

11. The protective cover system of claim 10, further including a first actuator connected to said controller whereby said first cover may be selectively displaced between said first stowed position and said first deployed position.

12. The protective cover system of claim 11, further including a second actuator connected to said control module whereby said second cover may be selectively displaced between said second stowed position and said second deployed position.

* * * * *